United States Patent
Kojima et al.

(10) Patent No.: US 11,634,050 B2
(45) Date of Patent: Apr. 25, 2023

(54) OCCUPANT PROTECTION APPARATUS

(71) Applicant: TOYODA GOSEI CO., LTD., Kiyosu (JP)

(72) Inventors: Yusuke Kojima, Kiyosu (JP); Tadashi Yamada, Kiyosu (JP); Takashi Iida, Kiyosu (JP); Hajime Kitte, Kiyosu (JP); Kenichi Fukurono, Kiyosu (JP); Joji Aoyama, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/377,945

(22) Filed: Jul. 16, 2021

(65) Prior Publication Data
US 2022/0048417 A1 Feb. 17, 2022

(30) Foreign Application Priority Data
Aug. 11, 2020 (JP) .............................. JP2020-135873

(51) Int. Cl.
*B60N 2/427* (2006.01)
*B60N 2/02* (2006.01)
*B60N 2/42* (2006.01)

(52) U.S. Cl.
CPC ....... *B60N 2/42763* (2013.01); *B60N 2/0224* (2013.01); *B60N 2/4221* (2013.01); *B60N 2/4279* (2013.01)

(58) Field of Classification Search
None
See application file for complete search history.

(56) References Cited

U.S. PATENT DOCUMENTS

| | | | | |
|---|---|---|---|---|
| 5,186,494 A | * | 2/1993 | Shimose | B60N 2/888 100/282 |
| 5,449,218 A | * | 9/1995 | Beauvais | B60N 2/4221 297/216.19 |
| 5,695,242 A | * | 12/1997 | Brantman | B60N 2/4221 280/743.1 |
| 6,050,635 A | * | 4/2000 | Pajon | B60N 2/42781 297/483 |
| 6,053,571 A | * | 4/2000 | Faigle | B60N 2/4228 297/216.13 |

(Continued)

FOREIGN PATENT DOCUMENTS

| | | | | |
|---|---|---|---|---|
| FR | 2797823 A1 | * | 3/2001 | ............ B60N 2/305 |
| JP | 2019-111991 A | | 7/2019 | |

*Primary Examiner* — David E Allred
(74) *Attorney, Agent, or Firm* — Posz Law Group, PLC

(57) ABSTRACT

An occupant protection apparatus includes a driver. The driver includes a drive unit, a support shaft, a movable seat pan supported by the support shaft such that the movable seat pan is inclinable in a front-rear direction, a guide groove, a movement pin that is movable along the guide groove, a link that couples the movable seat pan to the movement pin, and an energy absorber. The guide groove includes a first guide groove portion in which the movement pin moves when the movable seat pan is inclined rearward and a second guide groove portion in which the movement pin moves when the movable seat pan is inclined forward. The energy absorber is configured to absorb at least part of a forward load from an occupant when the movement pin moves in the second guide groove portion.

6 Claims, 8 Drawing Sheets

(56) References Cited

U.S. PATENT DOCUMENTS

| | | | | |
|---|---|---|---|---|
| 7,726,739 B2* | 6/2010 | Wain | ............... | B60N 2/986 |
| | | | | 297/284.11 |
| 8,240,758 B2* | 8/2012 | Combest | ............ | B60N 2/42718 |
| | | | | 297/216.19 |
| 8,272,687 B2* | 9/2012 | Gross | ............ | B60N 2/4221 |
| | | | | 297/284.11 |
| 8,297,697 B2* | 10/2012 | Gross | ............ | B60N 2/42718 |
| | | | | 297/284.11 |
| 8,393,681 B2* | 3/2013 | Gross | ............ | B60N 2/42763 |
| | | | | 297/284.11 |
| 9,994,138 B2* | 6/2018 | Whitens | ............ | B60N 2/62 |
| 10,793,032 B2* | 10/2020 | Ando | ............ | B60N 2/4214 |
| 2001/0011810 A1* | 8/2001 | Saiguchi | ............ | B60N 2/4221 |
| | | | | 296/68.1 |
| 2003/0222490 A1* | 12/2003 | Sakai | ............ | B60R 21/23184 |
| | | | | 297/216.1 |
| 2004/0055806 A1* | 3/2004 | Masuda | ............ | B60N 2/4279 |
| | | | | 180/282 |
| 2007/0222270 A1* | 9/2007 | Combest | ............ | B60N 2/42763 |
| | | | | 297/452.21 |
| 2011/0121621 A1* | 5/2011 | Masutani | ............ | B60N 2/4221 |
| | | | | 297/216.1 |
| 2019/0193609 A1 | 6/2019 | Ando et al. | | |

* cited by examiner

OCCUPANT PROTECTION APPARATUS

BACKGROUND

1. Field

The present disclosure relates to an occupant protection apparatus configured to protect an occupant seated on a vehicle seat from a frontal impact when a vehicle receives or is predicted to receive the impact.

2. Description of Related Art

When a land vehicle receives a frontal impact due to a frontal collision or the like, submarining may occur depending on the sitting posture of the occupant. In submarining, the lumbar region of the occupant restrained to a land vehicle seat by a seat belt device disengages from a lap belt portion and moves (slides) forward.

Japanese Laid-Open Patent Publication No. 2019-111991 discloses an example of a land vehicle seat designed to prevent submarining. The land vehicle seat includes a lumbar movement prevention member, a movement mechanism, and a controller. The lumbar movement prevention member extends in the width direction of the land vehicle seat. The lumbar movement prevention member is arranged at the front upper part in a seat cushion so as to be movable in the front-rear direction. The land vehicle seat includes side frames that are respectively located on the opposite sides of the land vehicle seat in the width direction. Each side frame includes a case extending in the front-rear direction. Each of the opposite ends of the lumbar movement prevention member is arranged in the corresponding case so as to be movable in the front-rear direction.

The movement mechanism moves the lumbar movement prevention member from an initial position toward a restraint position that is located rearward of the initial position. When a frontal impact on the vehicle is detected or predicted, the controller activates the movement mechanism to move the lumbar movement prevention member to the restraint position.

In the land vehicle seat having the above-described structure, the lumbar movement prevention member that has moved to the restraint position prevents the lumbar region of the occupant from moving forward (i.e., prevents submarining).

In addition, the land vehicle seat includes an energy absorption mechanism. When the lumbar region of the occupant causes the lumbar movement prevention member subsequent to being moved by the movement mechanism to receive load acting in a direction (acting forward) from the restraint position toward the initial position, the energy absorption mechanism absorbs at least part of the load so as to reduce the burden on the occupant.

In a fourth modification of the first embodiment in the above-described document, groove portions and pins are used as the energy absorption mechanism. Each groove portion is located in the corresponding case and extended in the front-rear direction. The pins are respectively accommodated in the opposite ends of the lumbar movement prevention member such that the pins are projectable and retractable in the width direction. Each groove portion includes a region with a width that is narrower than the diameter of the corresponding pin.

When the lumbar movement prevention member moves from the initial position to the restraint position, each pin protrudes from the lumbar movement prevention member to engage with the corresponding groove portion. In this state, when load acts on the lumbar movement prevention member to move from the restraint position toward the initial position, the pins move toward the initial position while pushing open the groove portions. Thus, at least part of the load is absorbed.

However, the movement of the lumbar movement prevention member from the initial position to the restraint position requires a mechanism that causes the pins to be retracted into the lumbar movement prevention member such that the pins do not engage with the groove portions. Accordingly, the land vehicle has a complicated structure.

Such a problem occurs not only in a land vehicle but also in a vehicle equipped with a vehicle seat that includes the same structure as the land vehicle seat.

SUMMARY

It is an objective of the present disclosure to provide an occupant protection apparatus with a simple structure capable of preventing the lumber part of an occupant from moving forward and reducing load on the occupant.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An occupant protection apparatus that solves the above-described problem is configured to be applied to a vehicle seat including a cushion portion designed to be seated by an occupant, the occupant protection apparatus comprising a driver configured to be arranged below the cushion portion, wherein the occupant protection apparatus is configured to protect the occupant from a frontal impact on a vehicle through the cushion portion by driving the driver when the impact is detected or predicted, the driver includes: a drive unit; a support shaft; a movable seat pan supported by the support shaft such that the movable seat pan is inclinable in a front-rear direction; a guide groove; a movement pin that is movable along the guide groove; a link that couples, to the movement pin, a portion of the movable seat pan located away from the support shaft, and an energy absorber, the movable seat pan is configured to: be inclined at an inclined position before the impact is detected or predicted; be inclined rearward so as to be standing upright at an upright position when receiving a rearward force from the drive unit in response to a detection or prediction of the impact; and be inclined forward by a forward load from the occupant when the rearward force is reduced or eliminated, the guide groove includes: a first guide groove portion in which the movement pin moves when the movable seat pan is inclined rearward; and a second guide groove portion which is connected to the first guide groove portion and in which the movement pin moves when the movable seat pan is inclined forward, and the energy absorber is configured to absorb at least part of the load when the movement pin moves in the second guide groove portion.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An occupant protection apparatus 30 for a land vehicle 5 according to an embodiment will now be described with reference to the drawings.

In the following description, the advancing direction of the land vehicle 5 is defined as a forward direction. With reference to the forward direction, the rearward, upward, downward, leftward, and rightward directions are defined.

Additionally, it is assumed that an occupant having a size equivalent to a crash test dummy is seated on a land vehicle seat 10.

Figure 1:
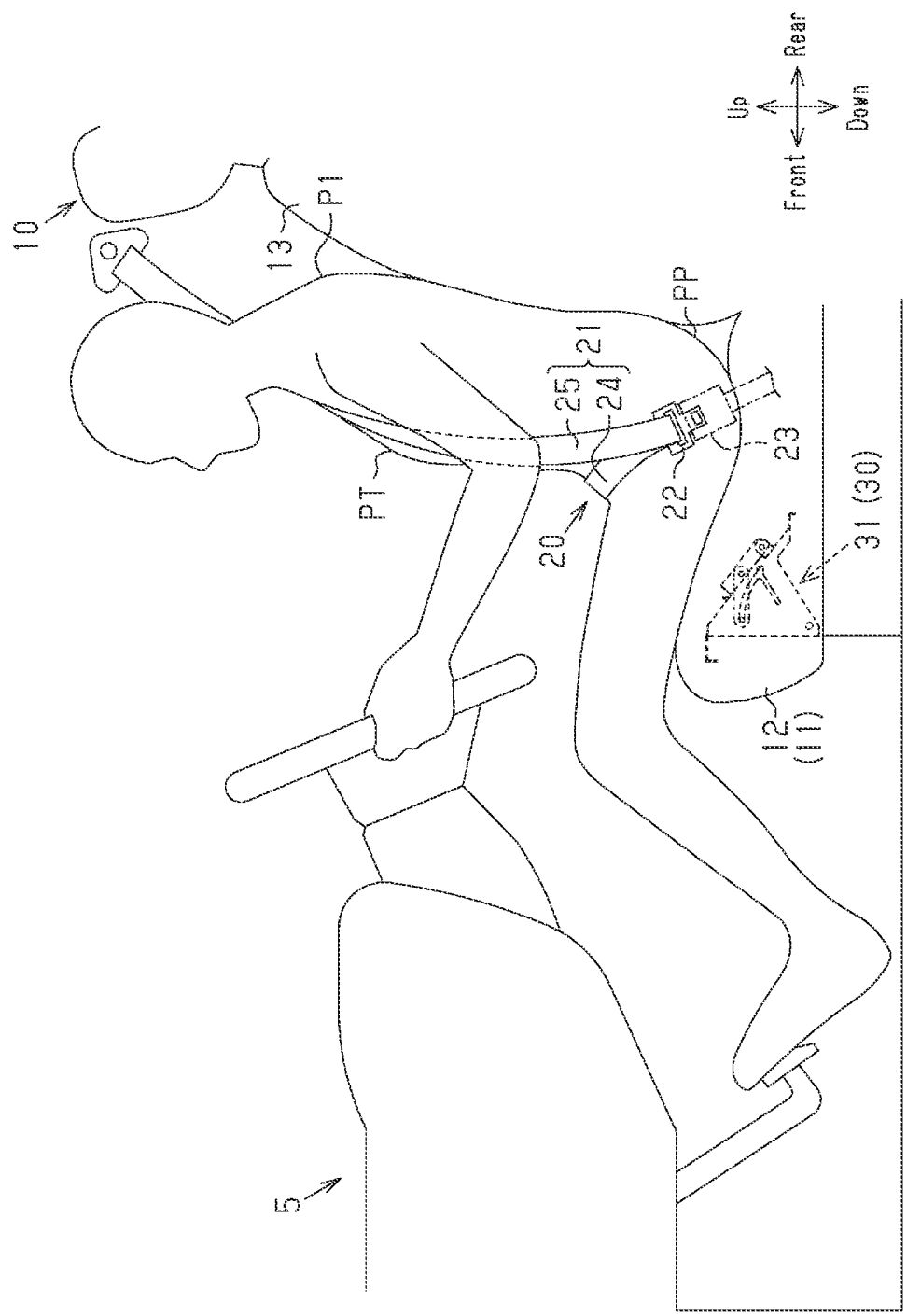
FIG. 1 is a side view showing a land vehicle seat equipped with an occupant protection apparatus according to an embodiment, together with an occupant and a seat belt device.

As shown in FIG. 1, the land vehicle 5, which serves as a vehicle, includes the land vehicle seat 10 as a vehicle seat. The land vehicle seat 10 includes a seat cushion 11 (seat) and a seatback 13 (backrest). The seatback 13 extends upright from the rear part of the seat cushion 11 and has an adjustable inclination angle. The land vehicle seat 10 is arranged in the land vehicle 5 such that the seatback 13 faces forward of the land vehicle 5. The front-rear direction of the land vehicle seat 10 coincides with the front-rear direction of the land vehicle 5, and the width direction of the land vehicle seat 10 coincides with the width direction of the land vehicle 5.

The seat cushion 11 includes a cushion portion 12 (refer to FIG. 3) and a seat frame (not shown) that supports the cushion portion 12 from below.

The land vehicle 5 includes a seat belt device 20 that restrains occupant P1 who is seated on the cushion portion 12 and is leaning on the seatback 13.

The seat belt device 20 includes a belt-like webbing 21, a tongue 22, and a buckle 23. The tongue 22 is attached to the webbing 21 such that the tongue 22 is movable in the longitudinal direction of the webbing 21. The buckle 23 is located inward of the seat cushion 11. The tongue 22 is attached to the buckle 23 such that the tongue 22 is engageable with and disengageable from the buckle 23. The webbing 21 includes a first end and a second end. The first end of the webbing 21 is fixed to a portion located in the land vehicle 5 and located outward of the seat cushion 11. Further, a seat belt retractor (not shown) is arranged on the portion located in the land vehicle 5 and located outward of the seat cushion 11. The webbing 21 is configured such that its second end is wound by the seat belt retractor. The seat belt device 20 is capable of adjusting the lengths of a lap belt portion 24 and a shoulder belt portion 25 by causing the tongue 22 to slide along the webbing 21.

The lap belt portion 24 is a portion of the webbing 21 between the tongue 22 and the first end of the webbing 21 (fixed end). The lap belt portion 24 traverses from one side of a lumbar region PP of the seated occupant P1 to the other side of the lumber region PP via the front side of the lumbar region PP. The shoulder belt portion 25 is a portion of the webbing 21 between the tongue 22 and the seat belt retractor, and traverses from a shoulder region of the seated occupant P1 to a side of the lumbar region PP obliquely via a thorax region PT.

Figure 2:
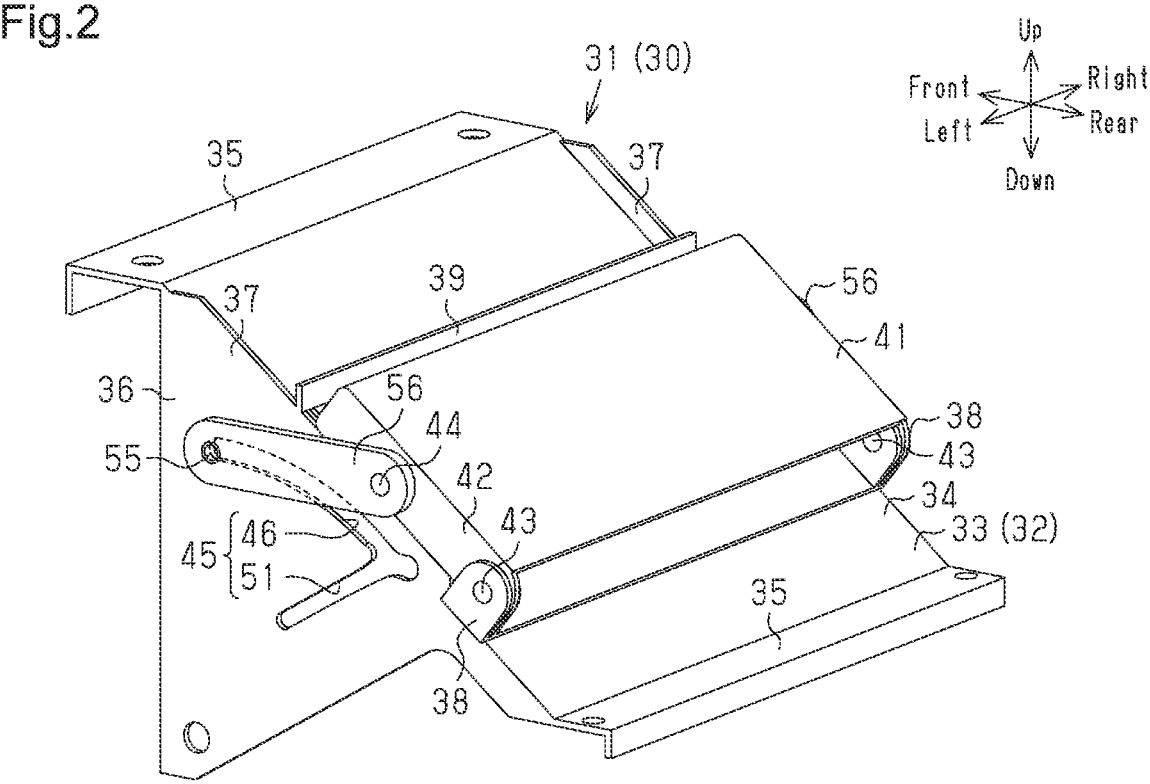
FIG. 2 is a perspective view showing the occupant protection apparatus in which a movable seat pan is inclined at an inclined position before an impact on the land vehicle is detected in the embodiment.
Figure 3:
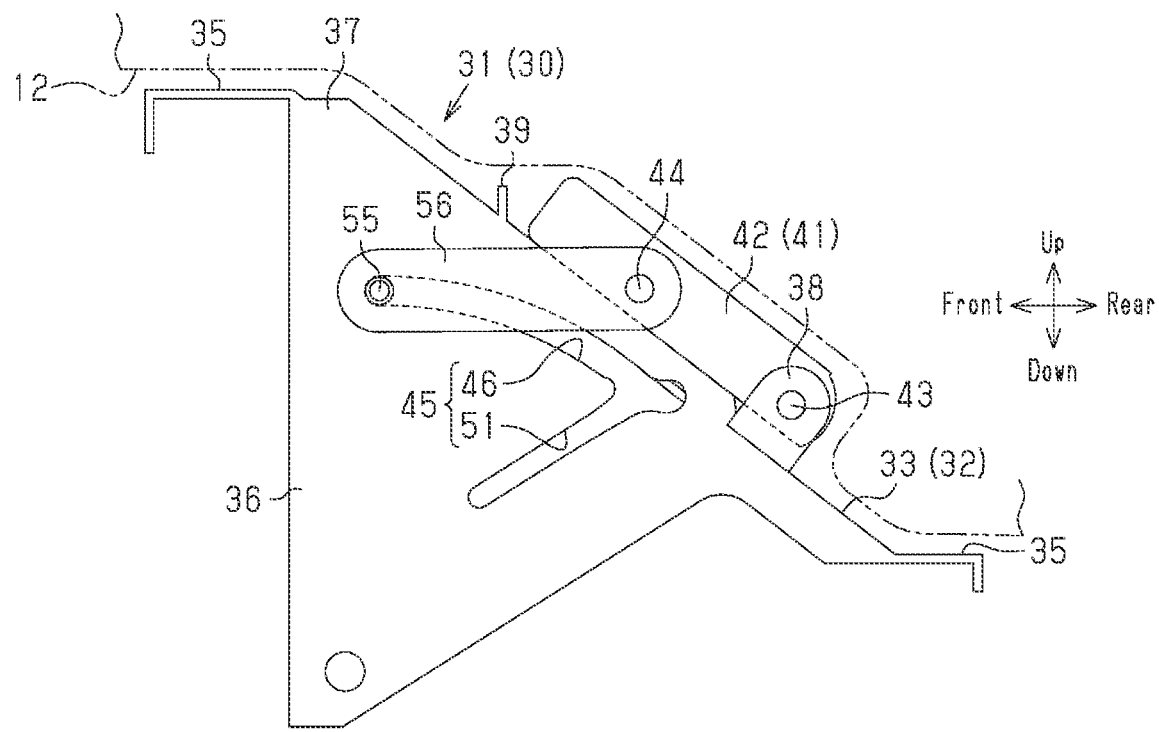
FIG. 3 is a side view showing the occupant protection apparatus in FIG. 2.
Figure 6:
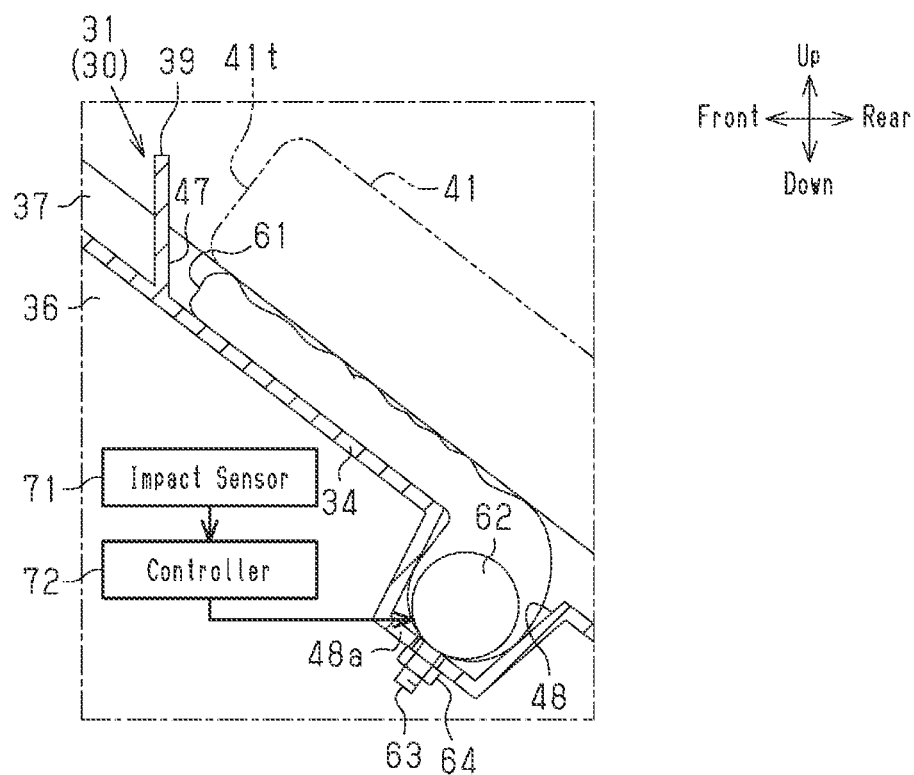
FIG. 6 is a partial cross-sectional side view showing a gas generator and an airbag in the occupant protection apparatus of the embodiment.

The land vehicle 5 is equipped with the occupant protection apparatus 30. As shown in FIGS. 1 and 6, the occupant protection apparatus 30 includes a driver 31, an impact sensor 71, and a controller 72. As shown in FIGS. 1 to 3, the driver 31 includes a body 32 and a drive unit and is incorporated into the front part of the seat cushion 11. Each of the components of the occupant protection apparatus 30 will now be described.

Body 32

As shown in FIGS. 2 and 3, the body 32 includes a base 33, a movable seat pan 41, two support shafts 43, two coupling pins 44, two guide grooves 45, two movement pins 55, and two links 56. FIGS. 2 and 3 show only one of the coupling pins 44, the guide grooves 45, the movement pins 55, and the links 56. The components of the body 32 are made of a hard material such as metal or plastic. In the present embodiment, the components of the body 32 are made of metal.

As shown in FIGS. 1 to 3, the body 32 is located below the cushion portion 12 and located forward of the lumbar region PP of occupant P1.

As shown in FIGS. 2 and 3, the base 33 includes an inclined plate 34, two attachment plates 35, two side plates 36, two bulged plates 37, two support plates 38, and a partition plate 39. FIGS. 2 and 3 show only one of the side plates 36.

The inclined plate 34 is inclined at a fixed angle so as to become higher toward the front side. The width of the inclined plate 34 in the left-right direction is generally fixed at any position in the front-rear direction. The front attachment plate 35 is arranged at the front upper end of the inclined plate 34 along the entire width of the inclined plate 34. The rear attachment plate 35 is arranged at the rear lower end of the inclined plate 34 along the entire width of the inclined plate 34.

The side plates 36 extend in the up-down direction and the front-rear direction and are continuous with the side portions of the inclined plate 34. A front plate (not shown), extending in the left-right direction and the up-down direction, is arranged between the front ends of the two side plates 36.

The left bulged plate 37 is bulged diagonally rearward and upward of the left edge of the inclined plate 34 in a region excluding the rear lower part of the inclined plate 34. The right bulged plate 37 is bulged diagonally rearward and upward of the right edge of the inclined plate 34 in a region excluding the rear lower part of the inclined plate 34. In the same manner as the inclined plate 34, each bulged plate 37 is inclined so as to become higher toward the front side.

The support plates 38 protrude diagonally rearward and upward of the rear lower sides of the bulged plates 37 at the left and right side edges of the inclined plate 34, respectively.

The partition plate 39 protrudes upward from a portion in the inclined plate 34 closer to the front end than the middle portion in the front-rear direction. The upper part of the partition plate 39 is located above the upper edges of the two bulged plates 37.

The movable seat pan 41 is formed into the shape of a low-height rectangular box by bending a plate, such as a metal plate. The left and right portions of the movable seat pan 41 include two side walls 42, respectively. FIGS. 2 and 3 show only one of the side walls 42. The movable seat pan 41 is supported at the support plates 38 by the support shafts 43, which are respectively located on the left and right sides of the movable seat pan 41.

Figure 7:
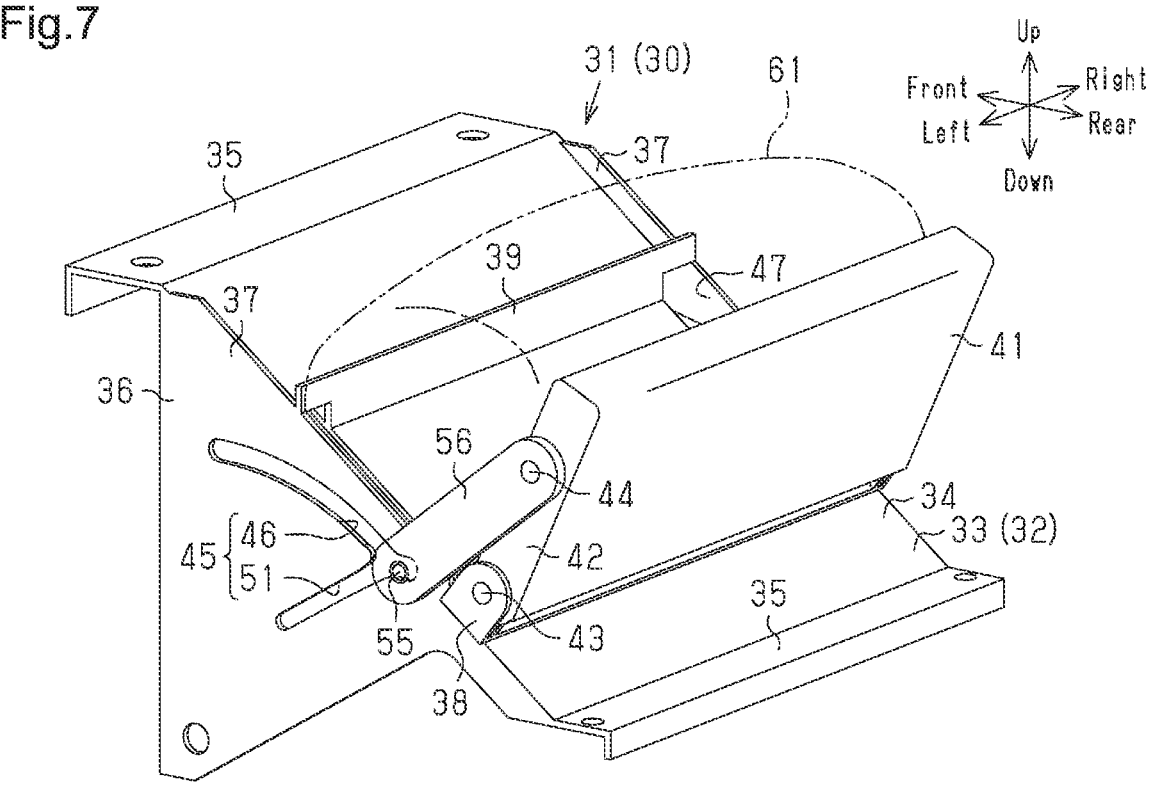
FIG. 7 is a perspective view showing the occupant protection apparatus in a state in which the movable seat pan in FIG. 2 is pressed by the airbag so as to be inclined rearward and standing upright at the upright position.
Figure 8:
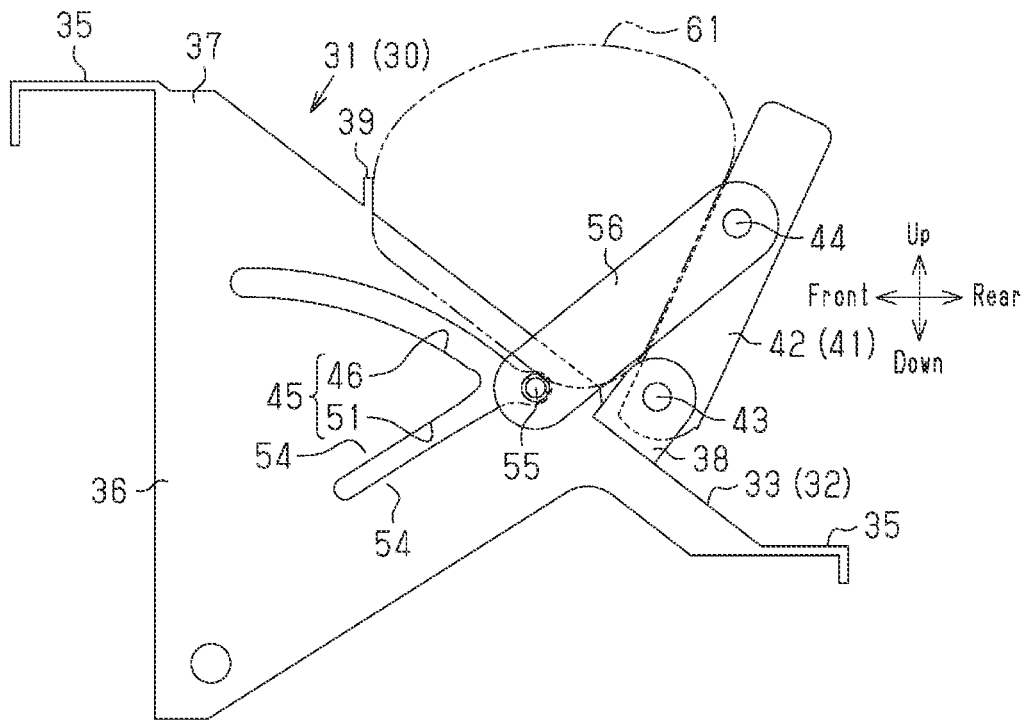
FIG. 8 is a side view showing the occupant protection apparatus in FIG. 7.
Figure 10:
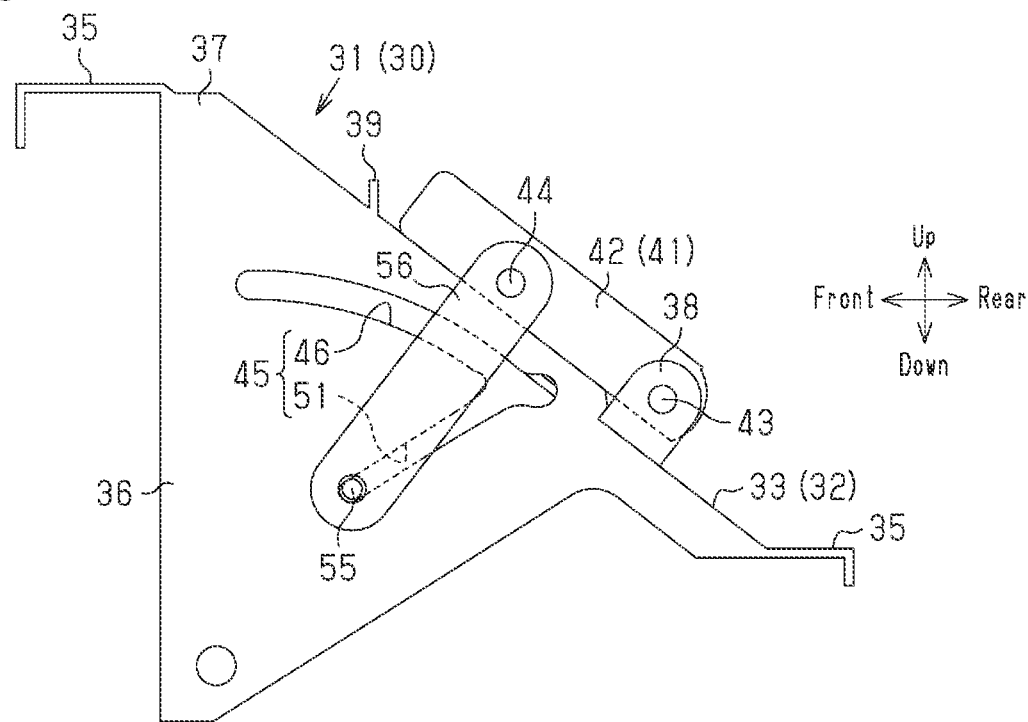
FIG. 10 is a side view showing the occupant protection apparatus in FIG. 9.
Figure 11:
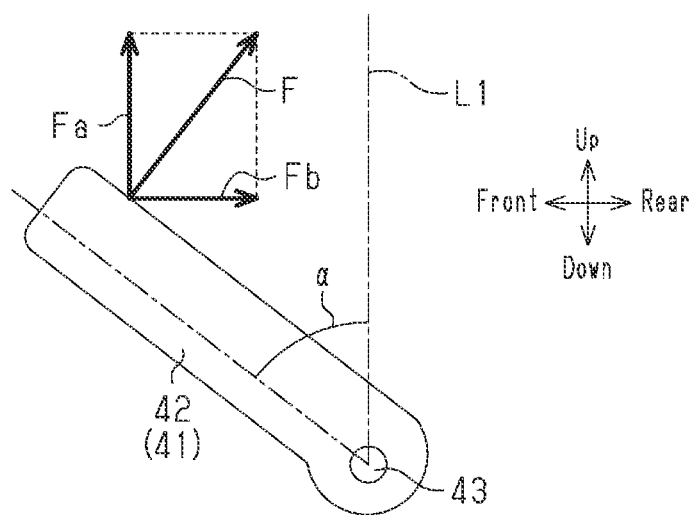
FIG. 11 is a diagram illustrating the relationship between a force and component forces that act on the movable seat pan in the embodiment.

The movable seat pan 41 is inclinable in the front-rear direction within a movable range. The movable range corresponds to a region between the inclined position shown in FIGS. 2, 3, 9, and 10 and the upright position shown in FIGS. 7 and 8. At the inclined position, the movable seat pan 41 is placed on the two bulged plates 37, and is inclined so as to become higher toward the front side in correspondence with the inclined plate 34. As shown in FIG. 11, the angle formed by the movable seat pan 41 relative to a vertical line L1 is $\alpha$. Angle $\alpha$ is set to approximately 500 in the present embodiment when the movable seat pan 41 is at the inclined position. As shown in FIG. 8, the movable seat pan 41 is substantially orthogonal to the inclined plate 34 at the upright position. Further, the movable seat pan 41 extends along the vertical line L1 and is substantially orthogonal to the horizontal plane. The movable seat pan 41 is supported by the support shafts 43 at a portion serving as a lower end when the movable seat pan 41 is standing upright at the upright position.

As shown in FIGS. 2 and 3, the two side walls 42 of the movable seat pan 41 respectively include the coupling pins 44 such that the coupling pins 44 are separated from the support shafts 43 by a certain distance. As shown in FIGS. 7 and 8, the coupling pins 44 are separated generally upward from the support shafts 43 in the movable seat pan 41 standing at the upright position.

As shown in FIGS. 2 and 3, the guide grooves 45 are located in the side plates 36. The guide grooves 45 extend through the side plates 36 in the thickness direction. Each movement pin 55 has a columnar shape and is inserted through the corresponding guide groove 45 so as to be movable in a direction corresponding to the guide groove 45. Each link 56 is formed into an elongated shape by a plate member, and couples the coupling pin 44 to the movement pin 55.

Thus, when the movable seat pan 41 is inclined in the front-rear direction, each coupling pin 44 moves on a circle centered by the corresponding support shaft 43. The movement of each coupling pin 44 is transmitted through the corresponding link 56 to the movement pin 55 so that the corresponding movement pin 55 moves along the corresponding guide groove 45.

Figure 4:
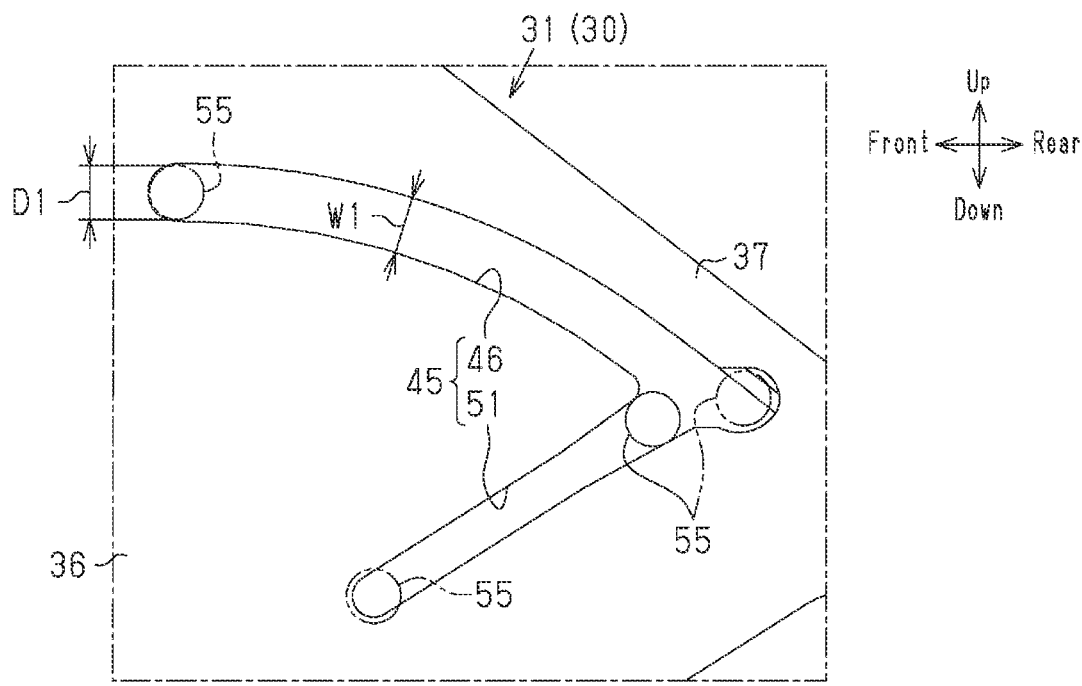
FIG. 4 is a partial side view illustrating the relationship between the guide groove and the movement pin.

The two guide grooves 45 have the same structure. As shown in FIG. 4, each guide groove 45 includes a first guide groove portion 46 and a second guide groove portion 51. Each first guide groove portion 46 is a portion of the guide groove 45 where the movement pin 55 moves when the movable seat pan 41 is inclined rearward. In each second guide groove portion 51, the corresponding movement pin 55 moves when the movable seat pan 41 is inclined forward.

As shown in FIGS. 3 and 4, the first guide groove portion 46 of each guide groove 45 extends substantially in the front-rear direction in a state of being gently curved so as to be bulged upward. The front end of each first guide groove portion 46 is located at the front upper part of the corresponding side plate 36. The rear end of each first guide groove portion 46 is located at a position of the corresponding side plate 36 that is proximate to the rear end of the inclined plate 34. The rear end of each first guide groove portion 46 is located forward of the support shaft 43 of the movable seat pan 41. Each first guide groove portion 46 has width W1 in the entire region of the first guide groove portion 46 in the front-rear direction. Width W1 is slightly larger than diameter D1 of the movement pin 55.

The second guide groove portion 51 of each guide groove 45 is located below the corresponding first guide groove portion 46. Each second guide groove portion 51 extends substantially in the front-rear direction in a state of being inclined at a fixed angle such that the second guide groove portion 51 becomes higher toward the rear side. The rear end of each second guide groove portion 51 is connected to the rear end of the first guide groove portion 46, which is located above the rear end of the second guide groove portion 51.

Figure 5:
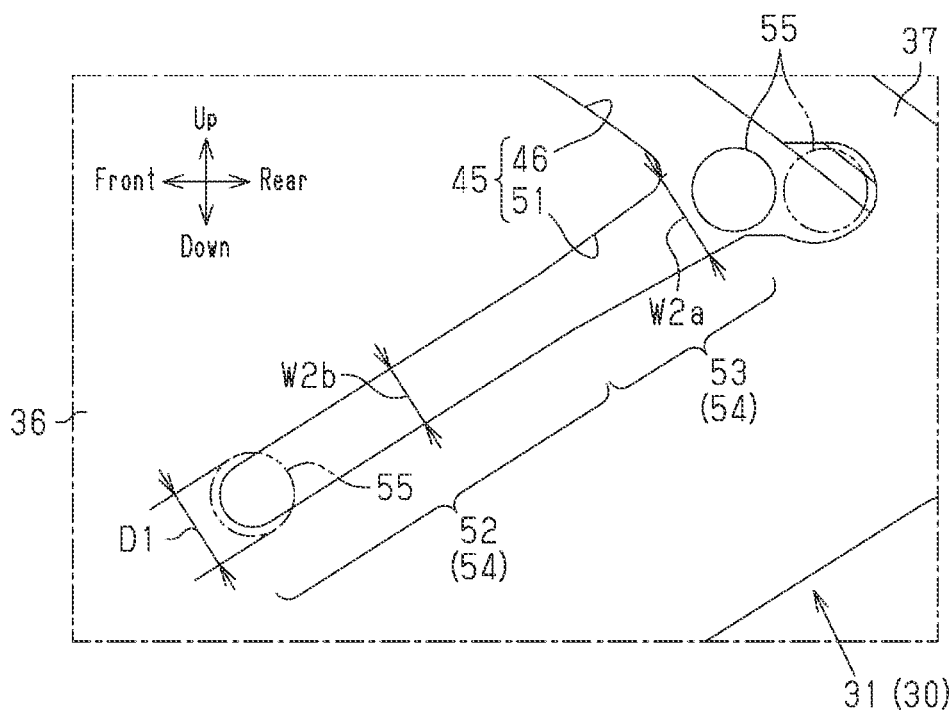
FIG. 5 is a partial side view illustrating the dimensional relationship between the second guide groove portion and the movement pin in FIG. 4.

As shown in FIG. 5, the rear end of each second guide groove portion 51 has width W2$a$ that is substantially equal to or slightly greater than diameter D1 of the movement pin 55. Each second guide groove portion 51 includes a region having width W2$b$ that is smaller than diameter D1. The region includes a groove width fixed region 52 in which width W2$b$ is smaller than diameter D1 and is fixed, and a groove width changing region 53 that is located on the rear side of the groove width fixed region 52 and increases in width toward the rear side. The groove width fixed region 52 and the groove width changing region 53 function as an energy absorber 54. The energy absorber 54 absorbs at least part of the load from occupant P1 when the movement pin 55 receives the load so as to move the movement pin 55 forward in the corresponding second guide groove portion 51.

Drive Unit

The drive unit is used to drive the driver 31. As shown in FIG. 6, the drive unit of the present embodiment includes an airbag 61 and a gas generator 62.

The airbag 61 is located at a position where the airbag 61 is capable of applying a rearward force to the movable seat pan 41 inclined at the inclined position. The position may be, for example, between the movable seat pan 41 inclined at the inclined position and the inclined plate 34 of the base 33. In the present embodiment, the airbag 61 is located closer to the inclined plate 34 than the movable seat pan 41, more specifically, located in an accommodation portion 47. The accommodation portion 47 is surrounded by the inclined plate 34, the two bulged plates 37, and the partition plate 39.

The airbag 61 is made of a fabric sheet (base fabric). The base fabric is preferably made of a flexible material having high strength, such as a woven cloth formed using polyester threads or polyamide threads. The airbag 61 includes a discharge hole (vent hole), which is not shown, out of which the gas in the inflated airbag 61 is discharged externally.

The gas generator 62 has a substantially columnar shape, and accommodates a gas generating agent (not shown) that generates inflation gas. The gas generator 62 is arranged in the airbag 61 so as to extend in the left-right direction. The gas generator 62 may include an inflator, or may include an inflator and a retainer that covers the inflator. Bolts 63 are fixed to the gas generator 62. Each bolt 63 is inserted through the airbag 61. This insertion causes the gas generator 62 to be engaged with and positioned relative to the airbag 61. Each bolt 63 is mostly exposed from the airbag 61.

The inclined plate 34 includes a recess 48 that is recessed diagonally forward and downward. The gas generator 62 and a part of the airbag 61 are accommodated in the recess 48. The portion of each bolt 63 exposed from the airbag 61 is inserted through a bottom wall 48a of the recess 48. Nuts 64 are threaded onto the bolts 63 from the diagonally front lower part of the bottom wall 48a, so that the gas generator 62 is fastened to the bottom wall 48a together with the airbag 61.

A majority of the airbag 61, prior to being inflated, is arranged in a portion of the accommodation portion 47 that differs from the recess 48. This majority of the airbag 61 may be arranged in a folded state or in a non-folded state.

Impact Sensor 71 and Controller 72

The impact sensor 71 includes, for example, an acceleration sensor and is configured to detect a frontal impact on the land vehicle 5. The controller 72 may be circuitry including one or more processors that operate according to a computer program (software), one or more dedicated hardware circuits that execute at least part of various processes, or a combination thereof. The controller 72 is configured to control activation of the gas generator 62 in response to a detection signal from the impact sensor 71.

The operation of the present embodiment will now be described. The advantages resulting from the operation will also be described.

Before a frontal impact on the land vehicle 5 is detected, the movable seat pan 41 remains inclined at the inclined position as shown in FIGS. 2 and 3. This makes the comfortableness of the cushion portion 12 less affected by the movable seat pan 41.

When a frontal collision of the land vehicle 5 shown in FIG. 1 produces a frontal impact on the land vehicle 5, occupant P1 seated on the cushion portion 12 attempts to move forward due to inertia. If occupant P1 is seated on the land vehicle seat 10 in a normal posture suitable for manual driving, the restraining action of the seat belt device 20 holds occupant P1 on the cushion portion 12. That is, the lumbar region PP attempting to move forward is caught by the lap belt portion 24. The lap belt portion 24 restrains the lumbar region PP to restrict the lumbar region PP from moving forward.

However, the lumbar region PP may attempt to move forward depending on the posture of occupant P1. This occurs when, for example, occupant P1 is in a relaxed posture (reclined posture). In other words, this is caused by a frontal impact that acts on the land vehicle 5 when the land vehicle 5 is autonomously driving and occupant P1 is leaning on the seatback 13 that is reclined more rearward than during manual driving. In such a case, the upper body of occupant P1 is inclined more rearward than during manual driving. This may cause the lumbar region PP to fail to be properly caught by the lap belt portion 24. Thus, the lap belt portion 24 may be unable to fully restrain the lumbar region PP, so that the lumbar region PP may slide through the lap belt portion 24 and move forward (i.e., submarining may occur).

When the impact sensor 71 shown in FIG. 6 detects an impact on the land vehicle 5 having a magnitude greater than or equal to a predetermined value, the controller 72 uses the detection signal to send, to the gas generator 62, an activation signal for activating the gas generator 62. In response to the activation signal, the gas generator 62 supplies inflation gas to the airbag 61. The inflation gas inflates the airbag 61 as shown by the broken line in FIGS. 7 and 8. The inflation energy of the airbag 61 causes a rearward force to act on the movable seat pan 41. This force inclines the movable seat pan 41 rearward, with the support shafts 43 serving as pivots. The guide grooves 45 restrict the movement of the movement pins 55 coupled to the movable seat pan 41 via the links 56. The movement pins 55 are movable in the direction corresponding to the guide grooves 45.

When the movable seat pan 41 is inclined rearward, the movement pins 55 move along the first guide groove portions 46. When the movement pins 55 moves to the rear ends of the first guide groove portions 46, the movable seat pan 41 becomes upright (enter an upright state) at the upright position.

Further movement of the movement pins 55 is restricted by the contact of the movement pins 55 on the inner wall surfaces of the rear ends of the first guide groove portions 46. This restricts rearward inclination of the movable seat pan 41 which is coupled to the movement pins 55 via the links 56. The movable seat pan 41 is restricted from being inclined more rearward than the upright position. That is, the rearwardly-inclined movable seat pan 41 is stopped at the intended upright position suitable for receiving the forward acting load of occupant P1. This allows the movable seat pan 41 to wait at the upright position until the lumbar region PP of occupant P1 enters.

The forward acting load of occupant P1 is transmitted through the cushion portion 12 to the movable seat pan 41 in the upright state. The load is received by the movable seat pan 41 so as to restrict forward movement of the lumbar region PP, thereby preventing the occurrence of submarining. At this time, since the movable seat pan 41 is in the upright state, the load is received on a broad surface of the movable seat pan 41. Thus, as compared with the load being received on a narrow surface, the occurrence of submarining is more properly prevented.

In the present embodiment, the airbag 61 that is inflated by inflation gas supplied from the gas generator 62 serves as the drive unit. Thus, the present embodiment allows for quicker driving than other methods in which an actuator of, for example, an electromagnetic type is used as the drive unit. This allows the movable seat pan 41 to be inclined rearward so as to become upright quickly, thereby allowing the movable seat pan 41 to enter the upright state that restricts forward movement of the lumbar region PP.

Figure 9:
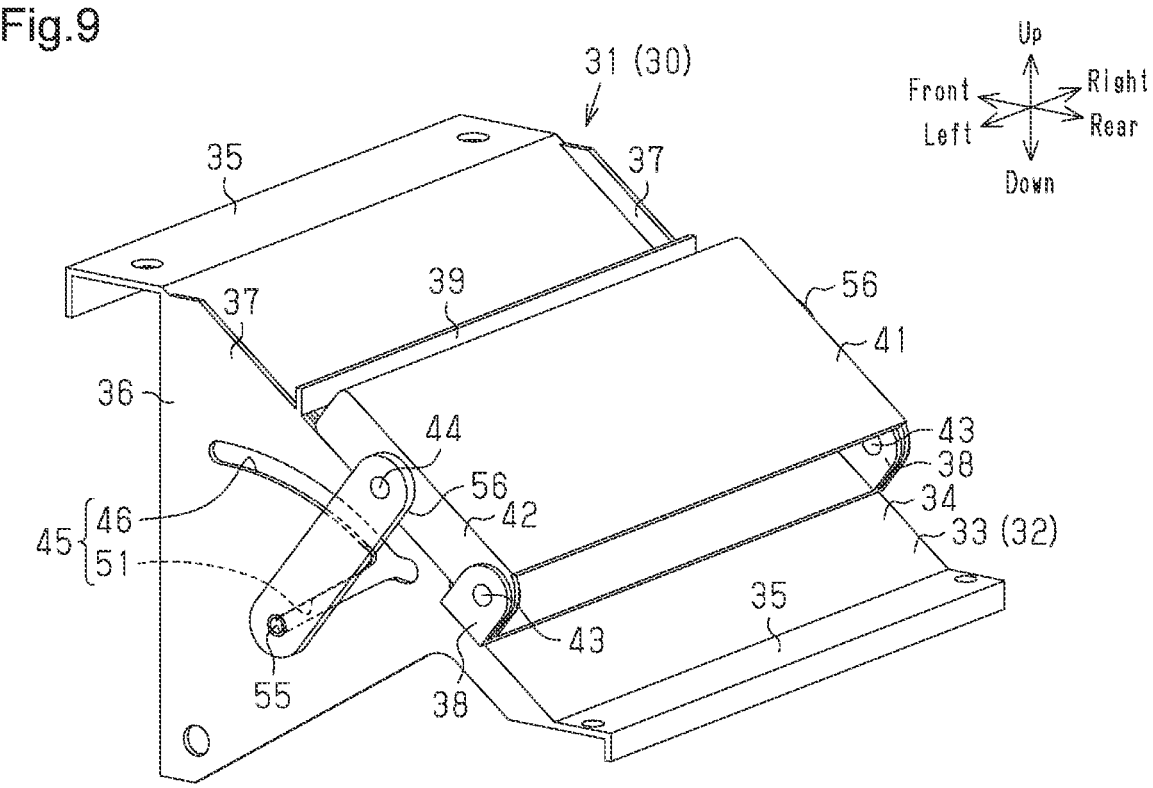
FIG. 9 is a perspective view showing the occupant protection apparatus in a state in which the movable seat pan in FIG. 7 is pressed so as to be inclined forward.

Subsequently, the inflation gas in the inflated airbag 61 is discharged out of the airbag 61 through the discharge holes (vent holes). This reduces or eliminates the rearward force of the airbag 61 that has been applied to the movable seat pan 41. As described above, the movable seat pan 41 receiving a forward load from occupant P1 through the cushion portion 12 is inclined rearward, with the support shafts 43 serving as pivots as shown in FIGS. 9 and 10. The movement of the movable seat pan 41 is transmitted through the links 56 to the movement pins 55. This transmission causes each of the movement pins 55 to receive a force acting forward and downward. The movement pins 55 move from the rear ends of the first guide groove portions 46 to the rear ends of the second guide groove portions 51, which are located below the first guide groove portions 46. As the movable seat pan 41 becomes inclined forward, the movement pins 55 move forward and downward along the second guide groove portions 51.

As shown in FIG. 5, during the movement of each movement pin 55 along the corresponding second guide groove portion 51, the movement pin 55 is pushed into the second guide groove portion 51. The movement pin 55 moves forward and downward along the energy absorber 54 while pushing open the energy absorber 54, which has a narrow width W2b in the second guide groove portion 51. During this movement, the hard movement pin 55 strongly interferes with the hard side plate 36 including the guide groove 45 so that the movement pin 55 receives resistance when moving forward and downward. At least part of the load (the energy that occurs when the lumbar region PP moves forward) is consumed (absorbed) by the movement pin 55 pushing the second guide groove portion 51 open. This reduces the load and thus reduces the burden on occupant P1.

In particular, as described above, the occupant protection apparatus 30 of the present embodiment includes the groove width fixed regions 52, which are respectively arranged in the second guide groove portion 51, as parts of the energy absorbers 54. Each groove width fixed region 52 has width W2b, which is smaller than diameter D1 of the corresponding movement pin 55. The above-described strong interference is produced by transmitting the forward inclination of the movable seat pan 41 through the link 56 to the movement pin 55 and pushing the movement pin 55 into the energy absorber 54 of the second guide groove portion 51. In even such a simple structure in which width W2b of each second guide groove portion 51 is smaller than diameter D1, at least part of the forward load from occupant P1 is absorbed. This eliminates the need for a complicated mechanism that absorbs the load.

It is assumed that each guide groove includes a single groove portion in the same manner as Japanese Laid-Open Patent Publication No. 2019-111991. In this structure, when the movable seat pan is inclined rearward or forward, each movement pin moves along the same groove portion. Only the forward inclination of the movable seat pan needs a complicated mechanism that absorbs at least part of the forward acting load of the occupant.

In the present embodiment, as shown in FIG. 4, each guide groove 45 includes a first guide groove portion 46 and a second guide groove portion 51. When the movable seat pan 41 is inclined rearward, the movement pin 55 is moved along the first guide groove portion 46. When the movable seat pan 41 is inclined forward, the movement pin 55 is moved along the second guide groove portion 51. During the movement of the movement pin 55 along the second guide groove portion 51, part of the forward acting load of occupant P1 is absorbed.

Accordingly, unlike the structure in which a guide groove includes a single groove portion, the present embodiment prevents the lumbar region PP of occupant P1 from moving forward and reduces the load on occupant P1, without a complicated mechanism.

In addition to the ones listed above, the present embodiment provides the following advantages.

As a part of the energy absorber 54, the rear side of the groove width fixed region 52 is provided with the groove width changing region 53 that increases in width toward the rear side. Thus, when the movement pin 55 moves forward along the groove width changing region 53, the movement pin 55 is guided to the middle portion in the width direction of the groove. This allows the movement pin 55 to be smoothly guided to the groove width fixed region 52.

Figure 12:
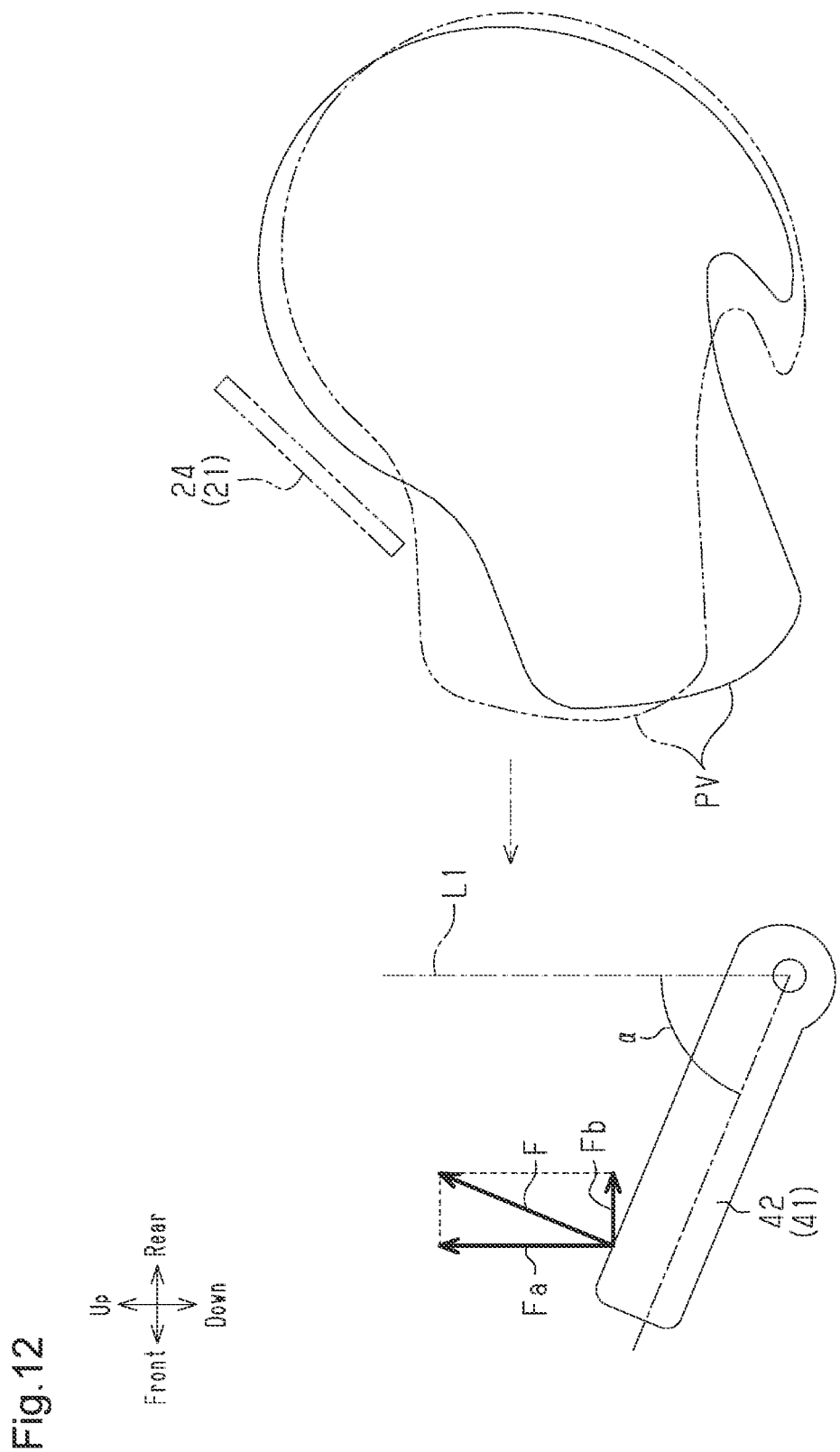
FIG. 12 is a diagram illustrating the relationship between a force and the component forces that act on the movable seat pan in a comparative example, together with the pelvis of the occupant.

During the rearward inclination of the movable seat pan 41 inclined at the inclined position, when a force F in the thickness direction acts on the movable seat pan 41, an upward component force Fa and a rearward component force Fb are produced as shown in FIGS. 11 and 12.

In a condition where the force F is fixed, as the inclination of the movable seat pan 41 becomes gentle, angle α formed by the movable seat pan 41 relative to the vertical line L1 becomes large and the component force Fa becomes large.

When the component force Fa becomes large, the rearwardly-inclined movable seat pan 41 pushes up the front part of the lumbar region PP (pelvis PV) as shown by the broken line to rotate the pelvis PV in a direction in which the rearward inclination is facilitated (in the clockwise direction in FIG. 12). In this case, the lumbar region PP of occupant P1 may sink underneath the lap belt portion 24 that restrains the lumbar region PP and slide forward.

Accordingly, the component force Fa is preferably small in order to prevent submarining. To obtain a small component force Fa, a small angle α with the movable seat pan 41 inclined at the inclined position (i.e., a steep inclination of the movable seat pan 41) is desired.

In the present embodiment, as shown in FIG. 11, since angle α is set to approximately 50°, the component force Fa is small. Accordingly, as compared with a large angle α shown in FIG. 12, situations are prevented in which the movable seat pan 41 pushes up the front part of the pelvis PV to rotate the pelvis PV in the direction in which the rearward inclination is facilitated. Consequently, the lumbar region PP of occupant P1 is prevented from sinking underneath the lap belt portion 24 that restrains the lumbar region PP and sliding forward.

The above-described embodiment may be modified as follows. The above-described embodiment and the following modifications can be combined as long as the combined modifications remain technically consistent with each other.

The gas generator 62 may be located outside of the airbag 61. In this case, the gas generator 62 may be connected to the airbag 61 by a tube so that the inflation gas generated in the gas generator 62 is supplied through the tube to the airbag 61.

Figure 13:
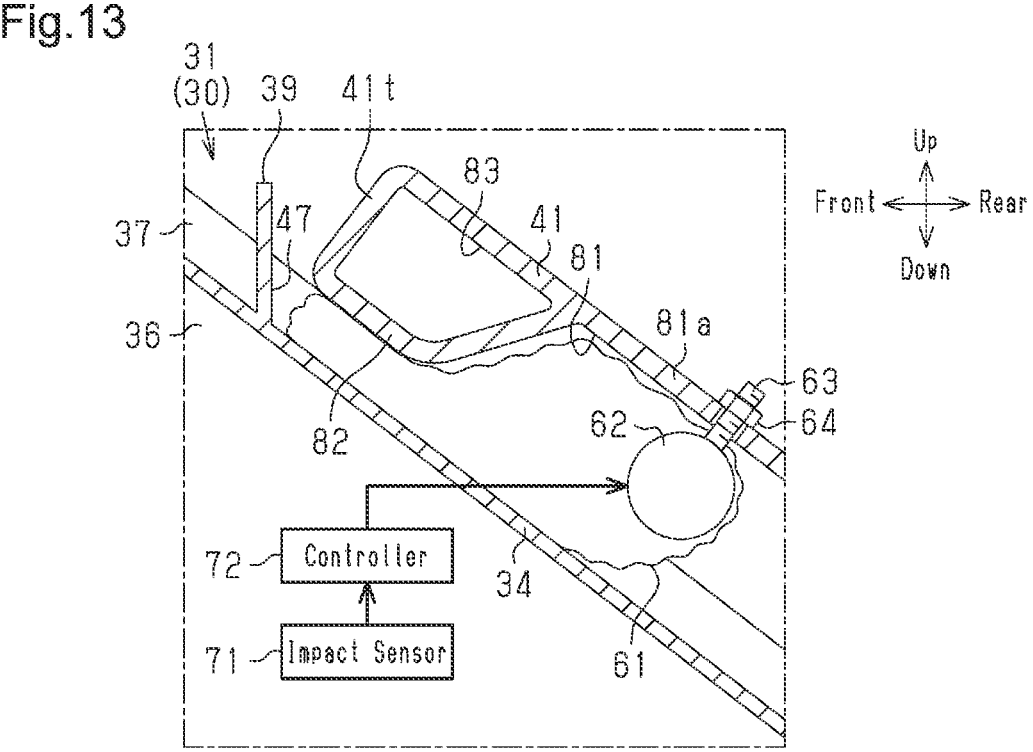
FIG. 13 is a partial cross-sectional side view that corresponds to FIG. 6, showing a modification in which the airbag and the gas generator are attached to the movable seat pan.

The airbag 61 may be located closer to the movable seat pan 41 than the inclined plate 34. FIG. 13 is an example of this structure. In this modification, the movable seat pan 41 includes a recess 81. The recess 81 opens in the surface closer to the inclined plate 34 and recesses diagonally rearward and upward. The movable seat pan 41 includes a portion 82 that differs from the recess 81 in the movable seat pan 41. In FIG. 13, the portion 82 is adjacent to the recess 81 diagonally forward and upward and includes a hollow part 83.

In the modification, the gas generator 62 is located inside of the airbag 61 and multiple bolts 63 are inserted through the airbag 61. This insertion causes the gas generator 62 to be engaged with and positioned relative to the airbag 61. Each bolt 63 is mostly exposed from the airbag 61.

The gas generator 62 and a part of the airbag 61 are accommodated in the recess 81. The portion of each bolt 63 exposed from the airbag 61 is inserted through a bottom wall 81a of the recess 81. The nuts 64 are threaded onto the bolts 63 from the diagonally rear upper part of the bottom wall 81a, so that the gas generator 62 is fastened to the bottom wall 81a together with the airbag 61.

The airbag 61 prior to being inflated is partly arranged in the accommodation portion 47. In the same manner as the above-described embodiment, the airbag 61 may be arranged in a folded state or in a non-folded state.

In this modification, in the same manner as the above-described embodiment, the gas generator 62 supplies inflation gas to the airbag 61 so as to inflate the airbag 61. The inflation energy of the airbag 61 causes a rearward force to act on the movable seat pan 41. This force inclines the movable seat pan 41 rearward, with the support shafts 43 serving as pivots. Therefore, this modification achieves the same operations and advantages as the above-described embodiment.

Particularly, in this modification, the portion 82 includes the hollow part 83 so that the movable seat pan 41 is lighter and is activated more easily than when the portion 82 is solid. This allows the movable seat pan 41 to be quickly inclined from the inclined position to the upright position and to be quickly inclined from the upright position to the inclined position.

On condition that the airbag 61 is located at a position where the airbag 61 is capable of applying a rearward force to the movable seat pan 41 inclined at the inclined position, the airbag 61 may be attached to a position that differs from those of the above-described embodiment and the modification of FIG. 13.

For example, the airbag 61 may be located at a position lower than (below) an upper end 41t of the movable seat pan 41 inclined at the inclined position. The upper end 41t is an end of the movable seat pan 41 opposite from the end at which the support shaft 43 is arranged. The position that satisfies the above-described condition includes a position below a certain position of the movable seat pan 41 (for example, below the upper end 41t and below the support shaft 43). The position that satisfies the above-described condition also includes a position between the upper end 41t and the support shaft 43.

Most of the airbag 61 may be formed by an inflation portion. Alternatively, the airbag 61 may partly include a non-inflation portion that remains uninflated because no inflation gas is supplied.

The drive unit may include a component that differs from the airbag 61 on the following condition. That is, in a case where a frontal impact on the land vehicle 5 is detected, the movable seat pan 41 receives a rearward force in response to the detection and becomes upright at the upright position so as to subsequently reduce or eliminate the force. Examples of the drive unit may include an electromagnetic actuator.

The energy absorber simply needs to absorb at least part of the load received from occupant P1 when the movement pin 55 moves diagonally downward and forward along the second guide groove portion 51. The energy absorber may absorb the entire load.

The energy absorber may be arranged at a member that differs from the side plate 36 having the second guide groove portion 51.

When the controller 72 predicts a frontal impact on the land vehicle 5 due to a frontal collision or the like, the controller 72 may send an activation signal to the gas generator 62 so that inflation gas is ejected from the gas generator 62.

While the occupant protection apparatus 30 provides a great effect particularly when applied to a self-driving land vehicle, the occupant protection apparatus 30 may also be applied to a normal manual-driving land vehicle. This case also provides the effect of restricting the lumbar region PP of occupant P1 from moving forward.

The land vehicle 5 to which the occupant protection apparatus 30 is applied includes various industrial land vehicles in addition to private cars.

The occupant protection apparatus 30 may be applied not only to an occupant protection apparatus installed in the land vehicle 5, but also to occupant protection apparatuses installed in seats of other vehicles such as aircrafts and ships.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An occupant protection apparatus configured to be applied to a vehicle seat including a cushion portion designed to be seated by an occupant, the occupant protection apparatus comprising a driver configured to be arranged below the cushion portion, wherein
the occupant protection apparatus is configured to protect the occupant from a frontal impact on a vehicle through the cushion portion by driving the driver when the impact is detected or predicted,
the driver includes:
a drive unit;
a support shaft;
a movable seat pan supported by the support shaft such that the movable seat pan is inclinable in a front-rear direction;
a guide groove;
a movement pin that is movable along the guide groove;
a link that is swingingly coupled to a portion of the movable seat pan and that couples, to the movement pin, the portion of the movable seat pan, which portion of the movable seat pan is located away from the support shaft; and an energy absorber, the movable seat pan includes a wall that defines an outer shape of the movable seat pan, the support shaft being arranged on the wall, the movable seat pan is configured to:
- be inclined at an inclined position before the impact is detected or predicted;
- be inclined rearward so as to be standing upright in an upright position when receiving a rearward force from the drive unit in response to a detection or prediction of the impact; and
- be inclined forward by a forward load from the occupant when the rearward force is reduced or eliminated, the guide groove includes:
- a first guide groove portion in which when the movement pin moves rearward, the movable seat pan moves rearward and upward; and
- a second guide groove portion which is connected to the first guide groove portion and in which when the movement pin moves forward, the movable seat pan moves forward and downward, wherein the first guide groove portion and the second guide groove portion generally form a V-shape, and the energy absorber is configured to absorb at least part of the load when the movement pin moves in the second guide groove portion.

2. The occupant protection apparatus according to claim 1, wherein the drive unit includes an airbag, and the airbag is configured to be inflated by inflation gas supplied from a gas generator so as to apply the rearward force to the movable seat pan inclined at the inclined position when the impact is detected or predicted.

3. The occupant protection apparatus according to claim 1, wherein the movement pin has a columnar shape, and the second guide groove portion includes, as the energy absorber, a region with a width that is smaller than a diameter of the movement pin.

4. The occupant protection apparatus according to claim 1, wherein the movable seat pan is supported by the support shaft at a portion serving as a lower end when the movable seat pan is standing upright at the upright position, the first guide groove portion extends in the front-rear direction, the second guide groove portion extends in the front-rear direction below the first guide groove portion, a rear end of the second guide groove portion is connected to a rear end of the first guide groove portion, the movement pin is located at the rear end of the first guide groove portion when the movable seat pan is standing upright at the upright position, and the rear end of the first guide groove portion is located forward of the support shaft.

5. The occupant protection apparatus according to claim 1, wherein the wall includes a side wall, and the support shaft is arranged on a portion of the side wall, the portion of the side wall serving as a lower end of the side wall when the movable seat pan is standing upright at the upright position.

6. The occupant protection apparatus according to claim 5, wherein the first guide groove portion extends in the front-rear direction, the second guide groove portion extends in the front-rear direction below the first guide groove portion, a rear end of the second guide groove portion is connected to a rear end of the first guide groove portion, the movement pin is located at the rear end of the first guide groove portion when the movable seat pan is standing upright at the upright position, and the rear end of the first guide groove portion is located forward of the support shaft.

* * * * *